(12) United States Patent
Yoshikawa et al.

(10) Patent No.: US 9,470,345 B2
(45) Date of Patent: Oct. 18, 2016

(54) THREADED JOINT FOR PIPES

(71) Applicant: JFE Steel Corporation, Tokyo (JP)

(72) Inventors: Masaki Yoshikawa, Tokyo (JP);
Takuya Nagahama, Tokyo (JP);
Hiroshi Chikatsune, Tokyo (JP); Jun Takano, Tokyo (JP); Takamasa Kawai, Tokyo (JP); Masateru Ueta, Tokyo (JP); Kazunari Takahashi, Tokyo (JP); Nobuhiko Morioka, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 118 days.

(21) Appl. No.: 14/351,976

(22) PCT Filed: Oct. 16, 2012

(86) PCT No.: PCT/JP2012/006607
§ 371 (c)(1),
(2) Date: Apr. 15, 2014

(87) PCT Pub. No.: WO2013/057926
PCT Pub. Date: Apr. 25, 2013

(65) Prior Publication Data
US 2015/0061287 A1 Mar. 5, 2015

(30) Foreign Application Priority Data
Oct. 17, 2011 (JP) .................................. 2011-227665

(51) Int. Cl.
*F16L 25/00* (2006.01)
*F16L 15/00* (2006.01)
(Continued)

(52) U.S. Cl.
CPC ........... *F16L 15/004* (2013.01); *C10M 103/04* (2013.01); *C10M 171/00* (2013.01);
(Continued)

(58) Field of Classification Search
USPC ................................. 285/333, 334, 390, 355
See application file for complete search history.

(56) References Cited

U.S. PATENT DOCUMENTS

2004/0108719 A1 6/2004 Carcagno et al.
2007/0048108 A1* 3/2007 Reynolds .............. F16B 33/004
411/366.1
(Continued)

FOREIGN PATENT DOCUMENTS

JP 2002-130552 5/2002
JP 2005-351324 12/2005
(Continued)

OTHER PUBLICATIONS

International Search Report corresponding to application No. PCT/JP2012/006607, dated Dec. 11, 2012.

*Primary Examiner* — Aaron Dunwoody
(74) *Attorney, Agent, or Firm* — RatnerPrestia

(57) ABSTRACT

In the threaded joint for pipes, a coating having a Vickers hardness greater than or equal to 310 is formed on a threaded portion of the box and an inner face of the box corresponding to a seal portion. The seal interference amount ratio $\delta/D$ of the seal portion in a pipe circumferential direction is greater than or equal to 0.002, where D is a seal diameter defined as an outside diameter of the pin at a seal point that is a point on the outer peripheral face of the nose of the pin at which the outer peripheral face first comes into contact with the inner peripheral face of the nose of the box and $\delta$ is an interference amount defined as an amount by which the outside diameter at the seal point is reduced by the box when the pin and the box are threadedly connected with each other.

6 Claims, 3 Drawing Sheets

(51) Int. Cl.
  *E21B 17/042* (2006.01)
  *C10M 171/00* (2006.01)
  *C10M 103/04* (2006.01)

(52) U.S. Cl.
  CPC ....... *E21B17/042* (2013.01); *C10M 2201/053* (2013.01); *C10N 2210/01* (2013.01); *C10N 2210/04* (2013.01); *C10N 2210/06* (2013.01); *C10N 2230/06* (2013.01)

(56) References Cited

U.S. PATENT DOCUMENTS

| | | | |
|---|---|---|---|
| 2008/0191479 A1 | 8/2008 | Suzuki | |
| 2008/0265569 A1* | 10/2008 | Carcagno | F16L 15/004 285/220 |
| 2010/0059986 A1 | 3/2010 | Kimoto et al. | |
| 2010/0206553 A1* | 8/2010 | Bailey | E21B 17/042 166/244.1 |
| 2011/0133449 A1* | 6/2011 | Mazzaferro | E21B 17/042 285/333 |
| 2011/0220348 A1* | 9/2011 | Jin | E21B 17/042 166/244.1 |
| 2011/0220415 A1* | 9/2011 | Jin | C23C 14/024 175/57 |
| 2011/0241340 A1* | 10/2011 | Okada | F16L 15/004 285/333 |
| 2013/0181442 A1* | 7/2013 | Sonobe | E21B 17/042 285/333 |
| 2014/0049045 A1* | 2/2014 | Yoshikawa | F16L 15/001 285/333 |
| 2014/0203556 A1* | 7/2014 | Besse | E21B 17/042 285/390 |
| 2015/0132539 A1* | 5/2015 | Bailey | C23C 14/028 428/141 |

FOREIGN PATENT DOCUMENTS

| | | |
|---|---|---|
| JP | 2006-506582 | 2/2006 |
| JP | 2008-215473 | 9/2008 |

* cited by examiner (a)

SEE FIG. 5(b)   SEE FIG. 5(c)

(b)

(c)

THREADED JOINT FOR PIPES

CROSS REFERENCE TO RELATED APPLICATION

This application is the U.S. National Phase Application of PCT International Application No. PCT/JP2012/006607, filed Oct. 16, 2012, which claims priority to Japanese Patent Application No. JP 2011-227665, filed Oct. 17, 2011, the contents of each of these applications being incorporated by reference herein in their entireties for all purposes.

FIELD OF THE INVENTION

The present invention relates to a threaded joint for pipes and, in particular, to a threaded joint for pipes that has high sealability and high galling resistance. The treaded joint is preferably used for connecting steel pipes such as pipes for oil wells, that is, OCTG (oil country tubular goods) including tubing and casing that are generally used to prospect for oil wells or gas wells and to produce oil or gas, riser pipes, and line pipes.

BACKGROUND OF THE INVENTION

Threaded joints are widely used for connecting OCTG and other steel pipes used in oil industry facilities. Typically, standard threaded joints as specified in American Petroleum Institute (API) standards have been used to connect steel pipes that are used to prospect for and to produce oil and gas. However, the drilling/production environment is becoming increasingly harsh in recent years because crude oil wells and natural gas wells are becoming deeper and the number of horizontal wells and directional wells are increasing relative to the number of vertical wells. Because development of wells in hostile environments such as oceans and polar regions is increasing, various characteristics such as resistance to compression, resistance to bending, sealability against external pressure (external pressure resistance) are required for a threaded joint. Therefore, an increasing number of special high-performance threaded joints, which are called premium joints, are being used, and the demand for improving the characteristics of such joints has been increasing.

Typically, a premium joint is a coupling-type joint in which a pair of externally threaded members (hereinafter referred to as pins) formed at ends of pipes and an internally threaded member (hereinafter referred to as a box) are coupled. Each of the pins includes a tapered thread, a seal portion (to be specific, a metal-to-metal seal portion), and a shoulder portion (to be specific, a torque shoulder portion). The box connects the pins to each other. The tapered thread is important for strongly fixing the pipe joint. The seal portion serves to secure sealability because the box and the pins come into metal-to-metal contact with each other in this portion. The shoulder portion forms a shoulder face that serves as an abutment when the joint is being fastened.

FIG. 5 schematically illustrates a premium joint for OCTG, showing a longitudinal section of a threaded joint for circular pipe. The threaded joint includes pins 3 and a box 1 corresponding to the pins 3. Each of the pins 3 includes an externally threaded portion 7 formed on an outer face thereof and a nose 8 (pin nose 8). The nose 8 is an unthreaded portion disposed at an end of the pin 3 and adjacent to the externally threaded portion 7. The nose 8 includes a seal portion 11 on an outer peripheral face thereof and a shoulder portion 12 on an end face thereof. The box 1, which faces the pin 3, has an inner face including an internally threaded portion 5, a seal portion 13, and a shoulder portion 14, which are respectively capable of mating with or coming into contact with the externally threaded portion 7, the seal portion 11, and the shoulder portion 12 of the pin 3. The numeral 15 denotes a load flank face.

Galling resistance and sealability are both required for a threaded joint for OCTG. Galling resistance is a property with which galling does not occur when the threaded joint is fastened and when it is fastened and loosened repeatedly. Sealability is a property with which leakage of fluid from the inside and inflow of fluid from the outside do not occur. However, galling resistance and sealability are generally incompatible with each other. For example, the probability of occurrence of galling can be reduced by decreasing the seal interference amount. In this case, however, metal-to-metal contact of the seal portion becomes weak and the probability of occurrence of leakage and inflow of fluid increases. For achieving sealability, using a radial seal type joint in which a pin or a box has a small seal taper angle is advantageous. However, when the seal taper angle is reduced, the sliding distance when fastening the joint increases and galling tendency increases.

In order to prevent galling, a coating is formed on a sliding face to reduce friction of metal-to-metal contact between the pin and the box. Also for a premium joint for OCTG, a coating is formed on the inner face of the box to prevent occurrence of galling when fastening the joint. For example, Patent Literature 1 describes forming a coating on a metal seal portion of one of a pin and a box of a threaded joint to achieve galling resistance.

PATENT LITERATURE

[PTL 1] Japanese Unexamined Patent Application Publication No. 2002-130552, which is incorporated by reference.

SUMMARY OF THE INVENTION

Patent Literature 1 describes a technology of preventing occurrence of galling between a pin and a box by forming a coating having a hardness Hv less than or equal to 300, which serves as a lubricant, on the box. However, within a radial seal type joints, for which the sliding distance at the seal position when fastening the joint is large, galling may occur if the seal interference amount is also large.

Accordingly, the present invention aims to provide a threaded joint for pipes, which is a radial seal type joint, including a good seal portion with which galling resistance is obtained even when sealability is obtained by increasing the seal interference amount, that is, with which both galling resistance and sealability are achieved.

The inventors carried out various examinations on a threaded joint for steel pipes including a good seal portion that can achieve both galling resistance and sealability, which are generally incompatible with each other. As a result, the inventors found the following fact and thereby accomplished the present invention: both galling resistance and sealability of a radial seal type threaded joint, in which a seal portion of one of a pin and a box is toroidal (shaped like a surface of revolution obtained by rotating a conic section) and a seal portion of the other of the pin and the box is linearly tapered, can be achieved when the hardness of a coating formed on the pin or the box and the seal interference amount ratio δ/D, which is calculated by dividing the seal interference amount δ by the seal diameter D, are respectively in specific ranges.

The present invention includes the following.

(1) A threaded joint for pipes includes a pin including an externally threaded portion and a nose extending from the externally threaded portion toward an end of a pipe; and a box including an internally threaded portion and an inner peripheral face of a nose, the internally threaded portion forming a threaded portion by being threadedly connected with the externally threaded portion, the inner peripheral face of the nose facing an outer peripheral face of the nose of the pin. When the pin and the box are threadedly connected with each other and the outer peripheral face of the nose of the pin and the inner peripheral face of the nose of the box come into metal-to-metal contact with each other in a radial direction at a contact portion, the contact portion serves as a seal portion. A coating having a Vickers hardness greater than or equal to 310 is formed on the threaded portion of the box and an inner face of the box corresponding to the seal portion. A seal interference amount ratio δ/D of the seal portion in a pipe circumferential direction is greater than or equal to 0.002, where D is a seal diameter defined as an outside diameter of the pin at a seal point that is a point on the outer peripheral face of the nose of the pin at which the outer peripheral face first comes into contact with the inner peripheral face of the nose of the box and δ is an interference amount defined as an amount by which the outside diameter at the seal point is reduced by the box when the pin and the box are threadedly connected with each other.

(2) The threaded joint for pipes according to (1) may be a radial seal type joint in which the outer peripheral face of the nose of the pin at the seal portion is toroidal and the inner peripheral face of the nose of the box at the seal portion is tapered in a sectional view taken along a pipe axis.

(3) In the threaded joint for pipes according to (1), the outer peripheral face of the nose of the pin at the seal portion may be tapered in a sectional view taken along a pipe axis and the inner peripheral face of the nose of the box at the seal portion may be toroidal.

(4) In the threaded joint for pipes according to any one of (1) to (3), the Vickers hardness of the coating may be greater than or equal to 350 and less than or equal to 700.

With the present invention, a threaded joint that has both high galling resistance and high sealability can be obtained.

DETAILED DESCRIPTION OF EMBODIMENTS OF THE INVENTION

Figure 1:
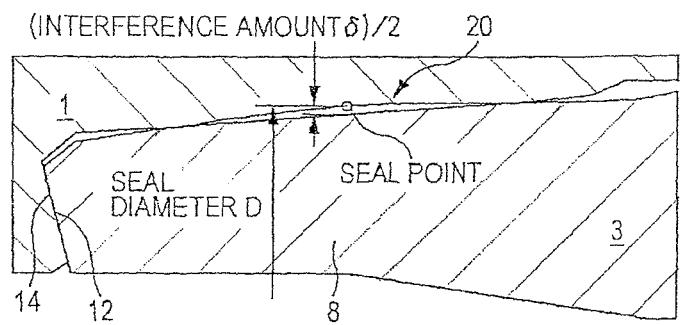
FIG. 1 is a sectional view illustrating the definition of the seal interference amount ratio δ/D of a seal portion in the pipe circumferential direction.
Figure 2:
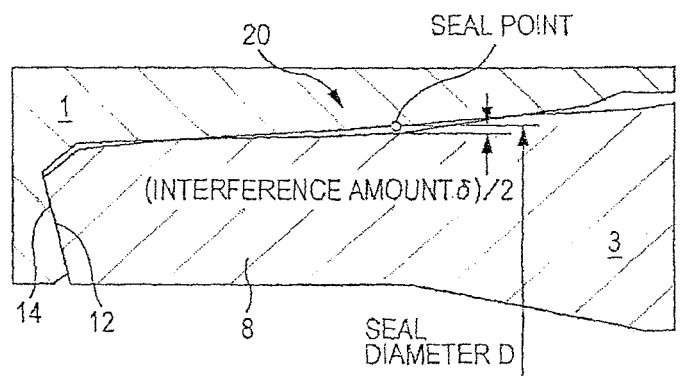
FIG. 2 is a sectional view illustrating the definition of the seal interference amount ratio δ/D of a seal portion in the pipe circumferential direction.

As illustrated in, for example, FIG. 1, a threaded joint for pipes includes a pin 3 and a box 1. The pin 3 includes an externally threaded portion (not shown in FIG. 1), a nose 8 extending from the externally threaded portion toward an end of a pipe, and a shoulder portion 12 disposed at a distal end of the nose 8. The box 1 includes an internally threaded portion (not shown in FIG. 1) that forms a threaded portion by being threadedly connected with the externally threaded portion, an inner peripheral face of a nose that faces an outer peripheral face of the nose of the pin 1, and a shoulder portion 14 that is in contact with the shoulder portion 12 of the pin 1. When the pin and box are threadedly connected with each other and the outer peripheral face of the nose of the pin and the inner peripheral face of the nose of the box come into metal-to-metal contact with each other at a contact portion, the contact portion serves as a seal portion 20. In the example illustrated in FIG. 1, the threaded joint for pipes is a radial seal type threaded joint in which the outer peripheral face of the nose of the pin at the seal portion 20 is toroidal (shaped like a surface of revolution obtained by rotating a conic section) and the inner peripheral face of the nose of the box at the seal portion 20 is tapered (shaped like a straight line that is inclined with respect to the pipe axial direction) in a cross-sectional view taken in the pipe axial direction. Alternatively, as illustrated in FIG. 2, the threaded joint for pipes may be a radial seal type joint in which the outer peripheral face of the nose of the box at the seal portion 20 is toroidal (shaped like a surface of revolution obtained by rotating a conic section) and in which the inner peripheral face of the nose of the pin at the seal portion 20 is tapered (shaped like a straight line that is inclined with respect to the pipe axial direction) in a cross-sectional view taken in the pipe axial direction.

To improve the sealability, that is, the air tightness of the threaded joint, the seal interference amount ratio δ/D of the seal portion in the pipe circumferential direction, where D is the seal diameter and δ is the interference amount, is set to be greater than or equal to 0.002. Here, as illustrated in FIG. 1 or 2, the seal diameter D is the outside diameter of the pin 3 at a seal point that is a point on the outer peripheral face of the nose of the pin 3 that first comes into contact with the inner peripheral face of the nose of the box 1 when the pin 3 and the box 1 are threadedly connected with each other, and the interference amount δ is the amount by which the outside diameter of the pin 3 at the seal point is reduced by the box 1 when the pin 3 and the box 1 are threadedly connected with each other.

The seal interference amount ratio δ/D represents the strain of a seal face in the pipe circumferential direction. When the perimeter (or circumference) at the seal point of the pin 3 is λ0 and a perimeter at a position where the diameter at the seal point of pin 3 is reduced by the box 1 is λ, these are expressed by λ0=πD and λ=π(D−δ) respectively. The strain of seal portion in the pipe circumferential direction is defined by Expression 1.

The seal interference amount ratio becomes larger and both the stress and strain generated at the contact face increase, in proportion to the increase of the amount of reduction of diameter.

$$\varepsilon = \left| \frac{\lambda - \lambda 0}{\lambda 0} \right| = \left| \frac{\pi(D-\delta) - \pi D}{\pi D} \right| = \frac{\delta}{D} \qquad \text{Expression 1}$$

It is preferable that the seal interference amount ratio δ/D of the seal portion in the pipe circumferential direction be less than or equal to 0.020, because an excessively high value of this ratio is disadvantageous with respect to galling resistance.

Figure 5:
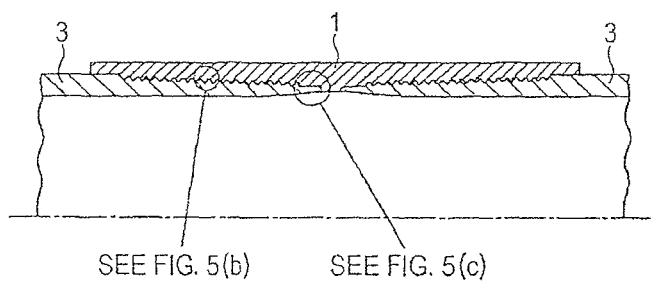
FIGS. 5(a) to 5(c) are sectional views of an existing threaded joint for steel pipes, FIG. 5(a) illustrating an overall sectional view, FIG. 5(b) illustrating an enlarged sectional view of a threaded portion in FIG. 5(a), and FIG. 5(c) illustrating an enlarged sectional view of the vicinity of a pin nose in FIG. 5(a).
Figure 5:
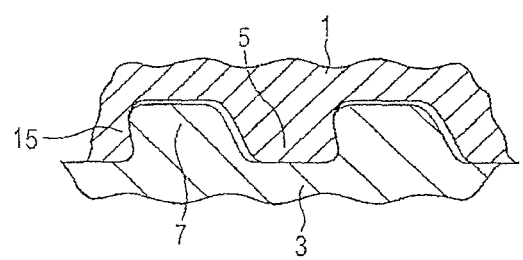
Figure 5:
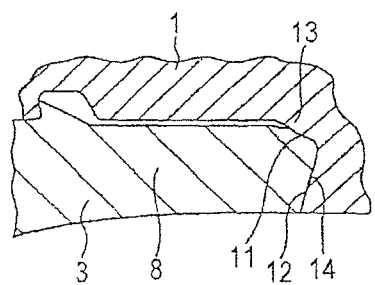

Moreover, according to the present invention, a coating having a Vickers hardness greater than or equal to 310 is preferably formed on the threaded portion of the box and an inner face of the box corresponding to the seal portion, that is, on the internally threaded portion 5 in FIG. 5(*b*) and an inner face of the box corresponding to the seal portion 20 in FIG. 1 or 2. A coating is formed on these portions because galling is most likely to occur at these portions. By forming a coating on these portions, friction of metal-to-metal contact between the pin and the box is reduced and occurrence of galling can be prevented.

When the coating has a Vickers hardness less than 310 and if the seal interference amount ratio is greater than or equal to 0.002, occurrence of galling is not sufficiently prevented. Therefore, it is preferable that the Vickers hardness of the coating be greater than or equal to 310, and more preferably greater than or equal to 350 and less than or equal to 700. When the Vickers hardness of the coating is greater than or equal to 350 and less than or equal to 700, the range of the seal interference amount can be set to be wide, the range of tolerance of cutting a thread can be set to be large, and thereby increase in the yield when manufacturing threaded joints can be expected.

Figure 3:
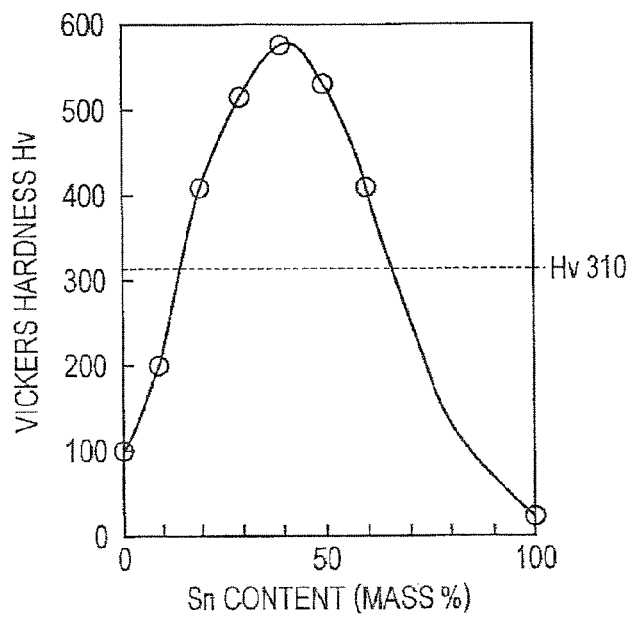
FIG. 3 is a graph representing the Vickers hardness of a Cu—Sn alloy coating when the Sn content is changed.

Examples of the coating include, for example, a Cu—Sn alloy coating. A coating having a Vickers hardness greater than or equal to 310 may be composed of, for example, a Sn content in the range of 15 to 65 mass % and the balance including Cu and incidental impurities. FIG. 3 is a graph representing the Vickers hardness of a Cu—Sn alloy coating when the Sn content is changed. The hardness of the coating can be adjusted by adjusting the Sn content in the Cu—Sn alloy coating. Another example of a coating having a Vickers hardness greater than or equal to 310 is a Cr coating. However, a coating used in the present invention is not limited to the Cu—Sn alloy coating and the Cr coating.

The thickness of the coating may be the approximately the same as that of a coating that is generally used for threaded joints for OCTG, which is in the range of 3 to 30 μm.

EXAMPLES

Steel pipes having an outside diameter of 9⅝ inches and a thickness of 0.545 inches were used as sample pipes, and threaded joints for connecting the sample pipes were made. The threaded joints are each a radial seal type threaded joint in which the seal portion of one of the outer peripheral face of the nose of the pin and the inner peripheral face of the nose of the box is toroidal (shaped like a surface of revolution obtained by rotating a conic section). A curve of a cross section of the toroidal surface taken in the pipe axial direction is an arc having a radius in the range of 1 to 3 inches. The seal portion of the other of the outer peripheral face of the nose of the pin and the inner peripheral face of the nose of the box is tapered with an angle in the range of 3 to 5 degrees with respect to the pipe axis. One of a Cu coating, a Cu—Sn alloy coating, and a Cr coating was formed on the inner face of the box of the threaded joint. The thickness of the coating was 12 μm. Table 1 shows the material of the sample pipe, the shape of the seal portion, the type of the coating, the hardness of the coating, and the seal interference amount ratio δ/D. In the materials of the sample pipes shown in Table 1, "Cr steel" is a 13% Cr steel having a yield strength of 110 ksi grade, and "C steel" is API Q125 steel having a yield strength of 125 ksi grade.

The M&B test and the sealability leak test A, which are defined in ISO 13679, were performed on these threaded joints.

The M&B test was performed to evaluate galling resistance. A lubricant was applied beforehand to the seal portion and the threaded portion, and a case where galling did not occur when fastening and loosening were repeated for more than 20 times was evaluated as good ("⊚A"), a case where galling occurred when fastening and loosening were performed 10 to 19 times was evaluated as fair ("○B"), a case where galling occurred when fastening and loosening were performed 5 to 9 times was evaluated as unsatisfactory ("ΔC"), and a case where galling occurred when fastening and loosening were performed less than 5 times was evaluated as bad ("XD").

The sealability leak test A was performed after fastening had been performed once, and a case where seal failure occurred was evaluated as "XD", and a case where seal failure did not occur was evaluated as "○A". Occurrence of seal failure was determined on the basis of a reference value of fluid leakage as specified in ISO 13679.

Table 1 shows the evaluations of galling resistance and sealability. Table 1 also shows the overall evaluation. The overall evaluation is "○A" for a case where the galling resistance was "○B" or "⊚A" and the seal failure did not occur ("○A"), and the overall evaluation is "XD" for other cases.

Figure 4:
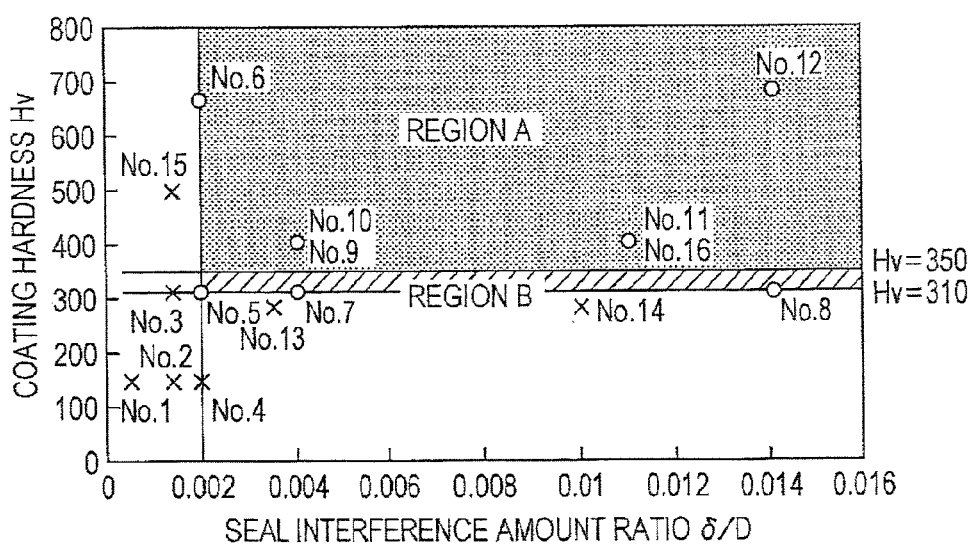
FIG. 4 is a graph representing the influence of the interference amount ratio δ/D and the hardness Hv of a coating on galling resistance and sealability.

FIG. 4 is a graph in which the overall evaluations in Table 1 are plotted by taking the interference amount ratio δ/D along the horizontal axis and the coating hardness Hv along the vertical axis.

Further, Region A represents a region in which galling did not occur in M&B test of 20 times and seal failure did not occur in sealability leak test A whereas Region B represents a region in which galling did not occur in M&B test of 10 times and seal failure did not occur in sealability leak test A.

TABLE 1

| Test No. | | 1 | 2 | 3 | 4 | 5 | 6 |
|---|---|---|---|---|---|---|---|
| Type of Sample Pipe | | 13 Cr Steel | 13 Cr Steel | 13 Cr Steel | 13 Cr Steel | 13 Cr Steel | C Steel (Q125) |
| Seal Portion | Shape of Outer Peripheral Face of Pin | Convex Arc Radius 3 inches | Convex Arc Radius 3 inches | Convex Arc Radius 3 inches | Convex Arc Radius 3 inches | Convex Arc Radius 3 inches | Convex Arc Radius 3 inches |
| | Shape of Inner Peripheral Face of Box | Tapered Taper Angle 3° | Tapered Taper Angle 3° | Tapered Taper Angle 3° | Tapered Taper Angle 3° | Tapered Taper Angle 3° | Tapered Taper Angle 3° |

TABLE 1-continued

| | | 1 | 2 | 3 | 4 | 5 | 6 |
|---|---|---|---|---|---|---|---|
| | Distance L between Seal Point and End of Pin (inches) | 0.2301 | 0.2301 | 0.2301 | 0.2301 | 0.2301 | 0.2301 |
| Coating | Material | Cu | Cu | Cu—Sn | Cu | Cu—Sn | Cr |
| | Hardness Hv | 145 | 150 | 312 | 150 | 311 | 668 |
| Seal Interference Amount δ/D | | 0.0005 | 0.0014 | 0.0014 | 0.002 | 0.002 | 0.002 |
| Resistance to Galling | Number of Times Galling Occurred | 7 | 3 | 14 | 2 | 13 | 23 |
| | Evaluation | ΔC | XD | ○B | XD | ○B | ⊚A |
| Seal-ability | Evaluation | XD | XD | XD | ○A | ○A | ○A |
| Overall Evaluation | | XD | XD | XD | XD | ○A | ○A |

| | | Test No. | 7 | 8 | 9 | 10 | 11 | 12 |
|---|---|---|---|---|---|---|---|---|
| Type of Sample Pipe | | | 13 Cr Steel | 13 Cr Steel | 13 Cr Steel | 13 Cr Steel | 13 Cr Steel | C Steel (Q125) |
| Seal Portion | Shape of Outer Peripheral Face of Pin | | Convex Arc Radius 3 inches | Convex Arc Radius 3 inches | Convex Arc Radius 1 inch | Convex Arc Composite of Radii 1 and 3 inches | Convex Arc Composite of Radii 1 and 3 inches | Convex Arc Radius 3 inches |
| | Shape of Inner Peripheral Face of Box | | Tapered Taper Angle 3° | Tapered Taper Angle 3° | Tapered Taper Angle 5° | Tapered Taper Angle 5° | Tapered Taper Angle 5° | Tapered Taper Angle 3° |
| | Distance L between Seal Point and End of Pin (inches) | | 0.2301 | 0.2301 | 0.2301 | 0.3100 | 0.3100 | 0.2301 |
| Coating | Material | | Cu—Sn | Cu—Sn | Cu—Sn | Cu—Sn | Cu—Sn | Cr |
| | Hardness Hv | | 312 | 315 | 400 | 403 | 403 | 680 |
| Seal Interference Amount δ/D | | | 0.004 | 0.014 | 0.004 | 0.004 | 0.011 | 0.014 |
| Resistance to Galling | Number of Times Galling Occurred | | 12 | 10 | 22 | 21 | 20 | 21 |
| | Evaluation | | ○B | ○B | ⊚A | ⊚A | ⊚A | ⊚A |
| Seal-ability | Evaluation | | ○A | ○A | ○A | ○A | ○A | ○A |
| Overall Evaluation | | | ○A | ○A | ○A | ○A | ○A | ○A |

| | | Test No. | 13 | 14 | 15 | 16 |
|---|---|---|---|---|---|---|
| Type of Sample Pipe | | | 13 Cr Steel | 13 Cr Steel | 13 Cr Steel | 13 Cr Steel |
| Seal Portion | Shape of Outer Peripheral Face of Pin | | Convex Arc Radius 3 inches | Convex Arc Composite of Radii 1 and 3 inches | Convex Arc Radius 3 inches | Tapered Taper Angle 5° |
| | Shape of Inner Peripheral Face of Box | | Tapered Taper Angle 3° | Tapered Taper Angle 5° | Tapered Taper Angle 3° | Convex Arc Composite of Radii 1 and 3 inches |
| | Distance L between Seal Point and End of Pin (inches) | | 0.2301 | 0.3100 | 0.2301 | 0.3100 |
| Coating | Material | | Cu—Sn | Cu—Sn | Cu—Sn | Cu—Sn |
| | Hardness Hv | | 290 | 290 | 500 | 403 |
| Seal Interference Amount δ/D | | | 0.0035 | 0.010 | 0.0014 | 0.011 |
| Resistance to Galling | Number of Times Galling Occurred | | 9 | 7 | 25 | 20 |
| | Evaluation | | ΔC | ΔC | ⊚A | ⊚A |
| Seal-ability | Evaluation | | ○A | ○A | XD | ○A |
| Overall Evaluation | | | XD | XD | XD | ○A |

As can be seen from the results shown in Table 1 and FIG. 4, when the seal interference amount ratio δ/D and the coating hardness are respectively in the ranges preferred according to the present invention, the overall evaluation is "◯A", which shows that the sealability and the galling resistance are both achieved. In particular, when the coating hardness Hv is greater than or equal to 350, galling did not occur in the M&B test of 20 times, which shows that the galling resistance is particularly high.

REFERENCE SIGNS LIST

1: box
3: pin
5: internally threaded portion
7: externally threaded portion
8: nose (pin nose)
11: seal portion
12: shoulder portion
13: seal portion
14: shoulder portion
15: load flank face
20: seal portion

The invention claimed is:

1. A threaded joint for pipes comprising:
a pin including an externally threaded portion and a nose extending from the externally threaded portion toward an end of a pipe; and
a box including an internally threaded portion and an inner peripheral face of a nose, the internally threaded portion forming a threaded portion by being threadedly connected with the externally threaded portion, the inner peripheral face of the nose facing an outer peripheral face of the nose of the pin,
wherein, when the pin and the box are threadedly connected with each other and the outer peripheral face of the nose of the pin and the inner peripheral face of the nose of the box come into metal-to-metal contact with each other in a radial direction at a contact portion, the contact portion serves as a seal portion,
wherein a coating including Cu—Sn alloy coating or Cr coating and having a Vickers hardness greater than or equal to 310 and less than or equal to 700 exists on the threaded portion of the box and an inner face of the box corresponding to the seal portion, and
wherein a seal interference amount ratio δ/D of the seal portion in a pipe circumferential direction is greater than or equal to 0.002, where D is a seal diameter defined as an outside diameter of the pin at a seal point that is a point on the outer peripheral face of the nose of the pin at which the outer peripheral face first comes into contact with the inner peripheral face of the nose of the box and δ is an interference amount defined as an amount by which the outside diameter at the seal point is reduced by the box when the pin and the box are threadedly connected with each other.

2. The threaded joint for pipes according to claim 1, wherein the threaded joint is a radial seal type joint in which the outer peripheral face of the nose of the pin at the seal portion is toroidal and the inner peripheral face of the nose of the box at the seal portion is tapered in a sectional view taken along a pipe axis.

3. The threaded joint for pipes according to claim 1, wherein the outer peripheral face of the nose of the pin at the seal portion is tapered in a sectional view taken along a pipe axis and the inner peripheral face of the nose of the box at the seal portion is toroidal.

4. The threaded joint for pipes according to claim 1, wherein the Vickers hardness of the coating including Cu—Sn alloy coating or Cr coating is greater than or equal to 350 and less than or equal to 700.

5. The threaded joint for pipes according to claim 2, wherein the Vickers hardness of the coating including Cu—Sn alloy coating or Cr coating is greater than or equal to 350 and less than or equal to 700.

6. The threaded joint for pipes according to claim 3, wherein the Vickers hardness of the coating including Cu—Sn alloy coating or Cr coating is greater than or equal to 350 and less than or equal to 700.

* * * * *